(12) United States Patent  (10) Patent No.: US 7,438,624 B2
Halstead et al.  (45) Date of Patent: Oct. 21, 2008

(54) GAME ATTRACTANT

(75) Inventors: Scott M. Halstead, Knoxville, TN (US); Gary L. Harding, Knoxville, TN (US)

(73) Assignee: Halstead Services Group, LLC, Knoxville, TN (US)

( * ) Notice: Subject to any disclaimer, the term of this patent is extended or adjusted under 35 U.S.C. 154(b) by 240 days.

(21) Appl. No.: 11/277,444

(22) Filed: Mar. 24, 2006

(65) Prior Publication Data

US 2006/0154561 A1    Jul. 13, 2006

Related U.S. Application Data

(63) Continuation-in-part of application No. 10/419,445, filed on Apr. 21, 2003, now Pat. No. 7,029,362.

(51) Int. Cl.
*A63H 5/00* (2006.01)
(52) U.S. Cl. .................................... 446/418; 446/397
(58) Field of Classification Search ............... 40/418, 40/419, 420, 421, 423; 43/2; 446/333, 356, 446/397
See application file for complete search history.

(56) References Cited

U.S. PATENT DOCUMENTS

| | | | |
|---|---|---|---|
| 1,171,125 A * | 2/1916 | Jones | ............................ 40/419 |
| 1,897,918 A * | 2/1933 | Wagenhals | .................... 40/423 |
| 4,531,924 A | 7/1985 | Samson | |
| 4,702,719 A | 10/1987 | Lapid | |
| 4,867,730 A * | 9/1989 | Lee | ............................ 446/353 |
| 4,934,088 A | 6/1990 | Pine, Jr. et al. | |
| 4,968,283 A | 11/1990 | Montgomery | |
| 5,555,664 A | 9/1996 | Shockley | |
| 5,794,568 A | 8/1998 | Udelle et al. | |
| 5,884,427 A * | 3/1999 | Lenz | ................................ 43/2 |
| 6,149,492 A | 11/2000 | Davis, Jr. | |
| 6,203,395 B1 | 3/2001 | McElhaney | |
| 6,210,251 B1 | 4/2001 | Primos et al. | |
| 6,289,626 B1 | 9/2001 | Williams | |
| 6,357,159 B1 | 3/2002 | Bowling | |
| 6,901,693 B1 * | 6/2005 | Crowe | ............................. 43/2 |
| 7,029,362 B1 | 4/2006 | Halstead | |
| 2001/0004812 A1 | 6/2001 | Lindaman | |

* cited by examiner

*Primary Examiner*—John Ricci
(74) *Attorney, Agent, or Firm*—Luedeka, Neely & Graham, PC (57) ABSTRACT

A device for generating sounds associated with movements of animals, the device including a movable member operatively associated with a motion generation system and configured to be set in a desired motion by the motion generation system, and an extension assembly configured to replicate a leg and foot of an animal and move in a desired path for contact with a desired contact medium to generate sounds that mimic sounds associated with movements of animals.

7 Claims, 10 Drawing Sheets

GAME ATTRACTANT

CROSS-REFERENCE TO RELATED APPLICATION

This is a continuation-in-part application of U.S. application Ser. No. 10/419,445 filed 21 Apr. 2003 now U.S. Pat. No. 7,029,362, and entitled GAME ATTRACTANT.

FIELD OF THE INVENTION

This invention relates generally to hunting aids. More particularly, this invention relates to a device for generating natural background noises for enhancing the effectiveness of game calls in attracting game.

BACKGROUND AND SUMMARY OF THE INVENTION

Calls simulating an animal noise are often used for attracting game to a hunter. For example, hunters of turkeys often use a call that mimics the vocal sounds of a female turkey in an attempt to attract a male turkey.

It has been observed that the effectiveness of such vocal calls may be increased if sounds associated with movement of a female turkey are provided in conjunction with the vocal sounds, such as by moving a fallen tree branch against the ground to mimic the sound of a female turkey rusting through leaves as during feeding.

As will be appreciated, it is often inconvenient and difficult for a hunter to remain concealed and still while manipulating a tree branch.

With regard to the foregoing, the present invention is directed to a device for generating sounds associated with movements of animals.

In a preferred embodiment, the device includes a movable member operatively associated with a motion generation system and configured to be set in a desired motion by the motion generation system. An extension assembly is provided and configured to replicate a leg and foot of an animal. The extension assembly includes an upper portion pivotally mounted relative to a pivot point and a lower portion connected to the movable member for being driven by the movable member in a desired path for contact with a desired contact medium to generate sounds that mimic sounds associated with movements of animals.

BRIEF DESCRIPTION OF THE DRAWINGS

Further features of preferred embodiments of the invention will become apparent by reference to the detailed description of preferred embodiments when considered in conjunction with the figures, which are not to scale, wherein like reference numbers, indicate like elements through the several views, and wherein.

DETAILED DESCRIPTION

Figure 1:
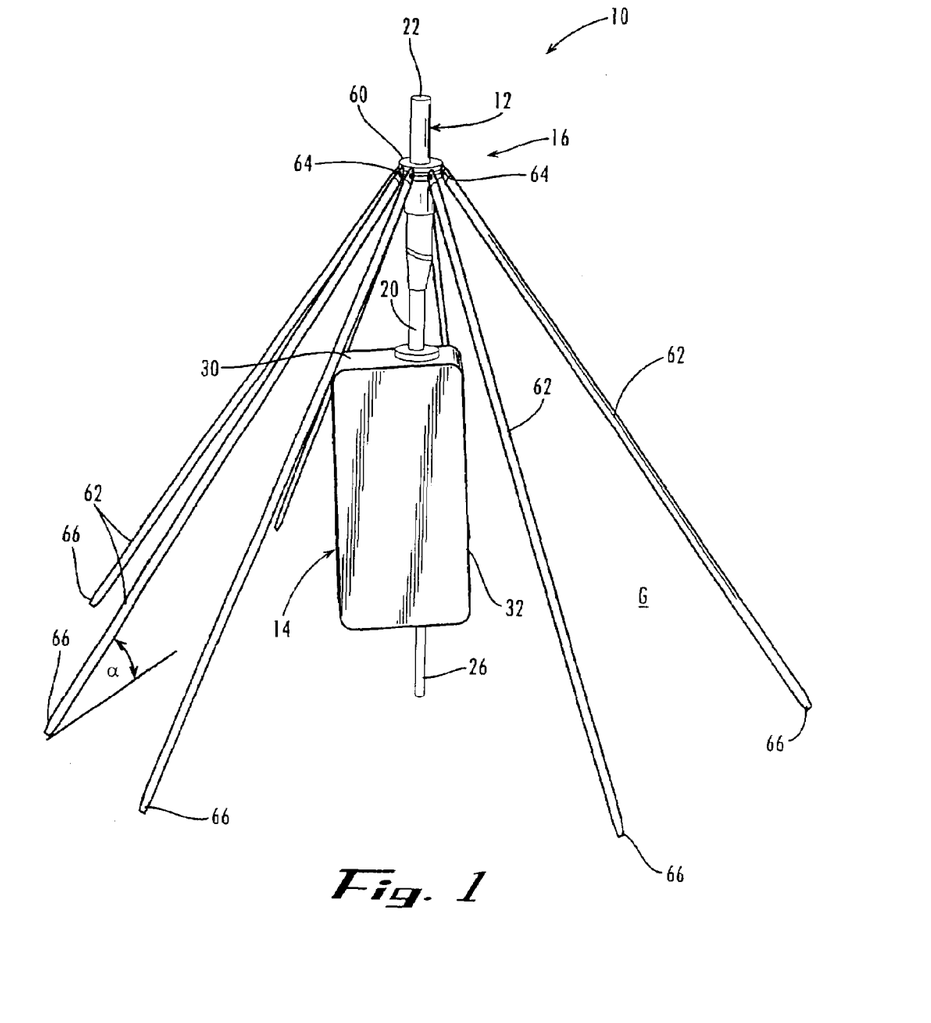
FIG. 1 is a perspective view of a device for remotely generating sounds associated with movements of animals in accordance with a preferred embodiment of the invention.

With initial reference to FIG. 1, the invention relates to a game attractant device 10 for generating sounds associated with movements of animals. The device 10 is particularly suitable for remotely generating sounds to mimic the sound of a turkey rustling through grass, leaves or other ground debris as during feeding.

The device 10 preferably includes a movable member 12, a motion generation system 14, and an extension assembly 16. The movable member 12 is configured to be set in a desired motion by the motion generation system 14. For example, in a preferred embodiment, a rotational motion is imparted to the movable member 12 by the motion generation system 14. It will be understood that the movable member 12 may be capable of other motions, such as translational and reciprocal motion.

The extension assembly 16 cooperates with the movable member 12 so as to cause contact with a desired contact medium to generate a sound. For example, in a preferred embodiment described below, portions of the extension assembly 16 contact grass, leaves or other debris on the ground to generate a rustling sound that mimics the sound of a turkey rustling through grass, leaves or other ground debris as during feeding.

Figure 2:
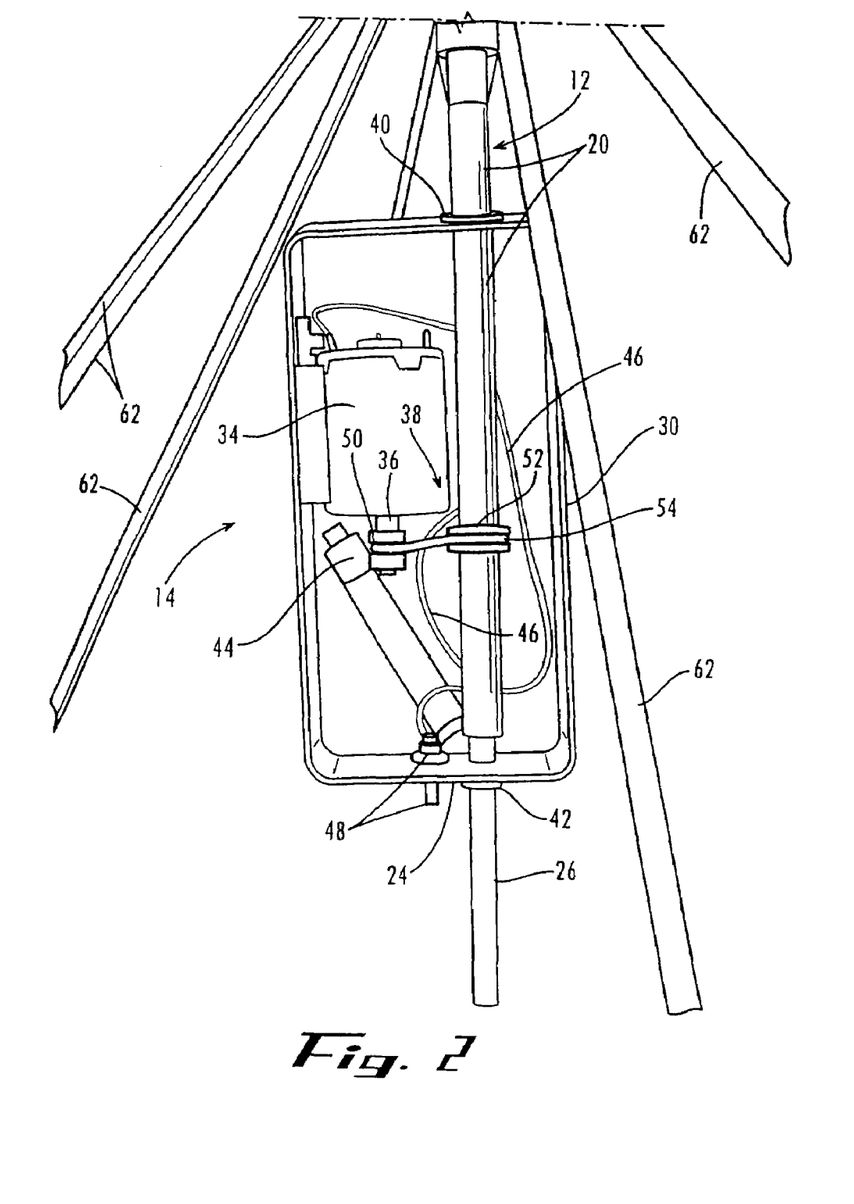
FIG. 2 is a detailed view of a drive assembly portion of the device of FIG. 1.

With further reference to FIG. 1 and with additional reference to FIG. 2, the movable member 12 may preferably be a rotatable shaft 20 and the motion generation system 14 may preferably be configured to cooperate with the shaft 20 to impart rotational motion to the shaft 20.

The shaft 20 is preferably an elongate shaft having opposite ends 22 and 24, with a relatively small external diameter of from about ⅛ to about 1 inch. The shaft 20 may preferably be hollow and include a rod 26 telescopically withdrawable from the end 24. The rod 26 may be inserted into the ground or the like for securably positioning the device 10 for use.

The motion generation system 14 preferably includes a housing 30, preferably of plastic having a removable cover 32, enclosing a motor 34, preferably a small direct current motor having a rotatable output shaft 36, and a transmission system 38 for transmitting rotational motion of the output shaft 36 to the shaft 20. In this regard, the housing 30 preferably includes oppositely disposed apertures 40 and 42 for passage of the shaft 20 and/or rod 26 through the housing 30.

The motor 64 may be of single speed or may include electronic controllers or the like for adjusting and/or varying its rotational speed as may be desired. For use in generating sounds mimicking a turkey or turkeys feeding, the motor 34 preferably has a rotational speed of from about 5 to about 50 rpms.

The motor 34 is preferably powered as by a battery 44, such as a AA size battery, located within the housing 30 and connectable to wiring 46 associated with the motor 34. The wiring 46 is preferably connected to an on/off switch 48 associated with the motor 34 and partially extending through the housing 30 for access by a user. As will be appreciated, a remotely activatable switch, such as an infrared switch may be utilized instead of the mechanical switch 48. As noted above, a timing or other control device may also be incorporated to periodically control the operation of the motor 34. For example, the motor may be periodically controlled to start or stop motion and/or change the speed thereof.

The transmission system 38 is preferably provided by a drive pulley 50 associated with the output shaft 36 of the motor 34, a driven pulley 52 associated with the shaft 20, and a belt 54 extending around the drive pulley and the driven pulley. Accordingly, rotation of the shaft 36 during operation of the motor 34 results in rotation of the drive pulley 50, which motion is imparted by the belt 54 to the driven pulley 52 and hence to the shaft 20. The pulleys 50 and 52 may be similarly sized or differently sized, or adjustably sized if desired to provide a desired rotational speed or speeds of the shaft 20.

The extension assembly 16 preferably includes a hub 60 mounted to the shaft 20 adjacent the end 22 and having a plurality of extension members 62 connected thereto. The hub 60 is preferably fixedly mounted to the shaft 20, but is preferably adjustable so that its location along the shaft 20 may be adjusted. For example, the location of the hub 60 may be fixed as by a set screw, wherein the set screw may be released to reposition the hub 60.

The extension members 62 are preferably elongate rods or the like pivotally mounted to the hub 60 as by hinges 64. The hinges 64 may simply be provided as by pins extending through corresponding and aligned apertures of the hub 60 and one end of the extension members 62. The action of the hinges 64 is useful to facilitate use of the device 10 on uneven contact surfaces.

The extension members 62 are preferably of sufficient length so as to be able to contact the ground G or other contact surface during use of the device 10. More preferably, the extension members are sufficiently long such that they are oriented at an angle α relative to the ground of from about 10 to about 60 degrees.

The device 10 is preferably installed as by inserting the rod 26 into the ground G so that the housing 30 is adjacent the ground 30 and the end 22 of the shaft 20 extends away from the ground G, with the shaft 20 substantially normal to the ground G and free ends 66 of the extension members 62 in contact with or closely adjacent the ground G. Leaves, twigs, grass, or other debris is preferably lightly piled around the extension members 62 and the switch 48 activated to enable power to be supplied to the motor 34 and result in rotation of the extension members 62.

During rotation, one or more of the extension members 62 at least periodically contact the leaves or other debris so as to generate a corresponding sound. It has been observed that the resulting sounds mimic the sounds of a turkey or turkeys rustling through leaves or the like as when feeding. It has been further observed that such rustling sounds are advantageous when hunting turkeys, especially when used in conjunction with a call that mimics the vocal sounds of a turkey.

Figure 3:
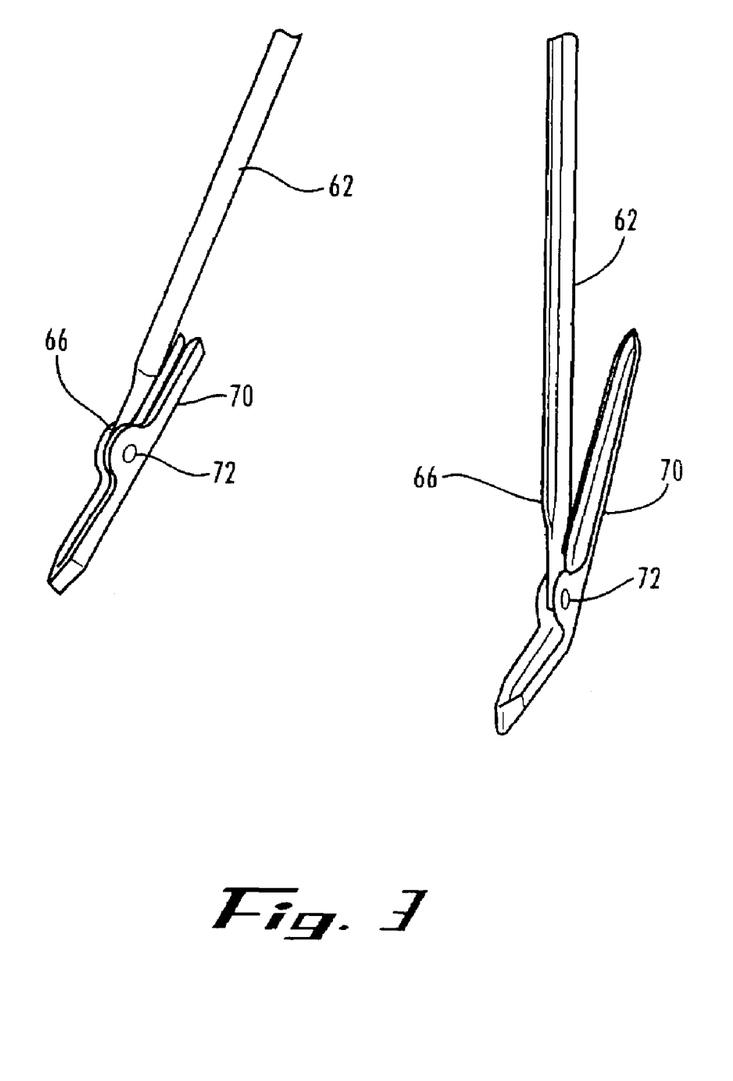
FIG. 3 is a detailed view of alternate embodiments of ground contact members for use with the device of FIG. 1.

Turning now to FIG. 3, there is seen a preferred modification of the device 10 wherein the free ends 66 of the extension members 62 are configured to include feet 70 for increasing the surface area available for contacting leaves and the like. The feet 70 are preferably pivotally mounted to the ends 66 to enable the feet 70 to better accommodate uneven surfaces such as the ground, leaves, and the like. For example, pins 72 may be inserted through aligned apertures of the ends 66 and the feet 70.

Figure 4:
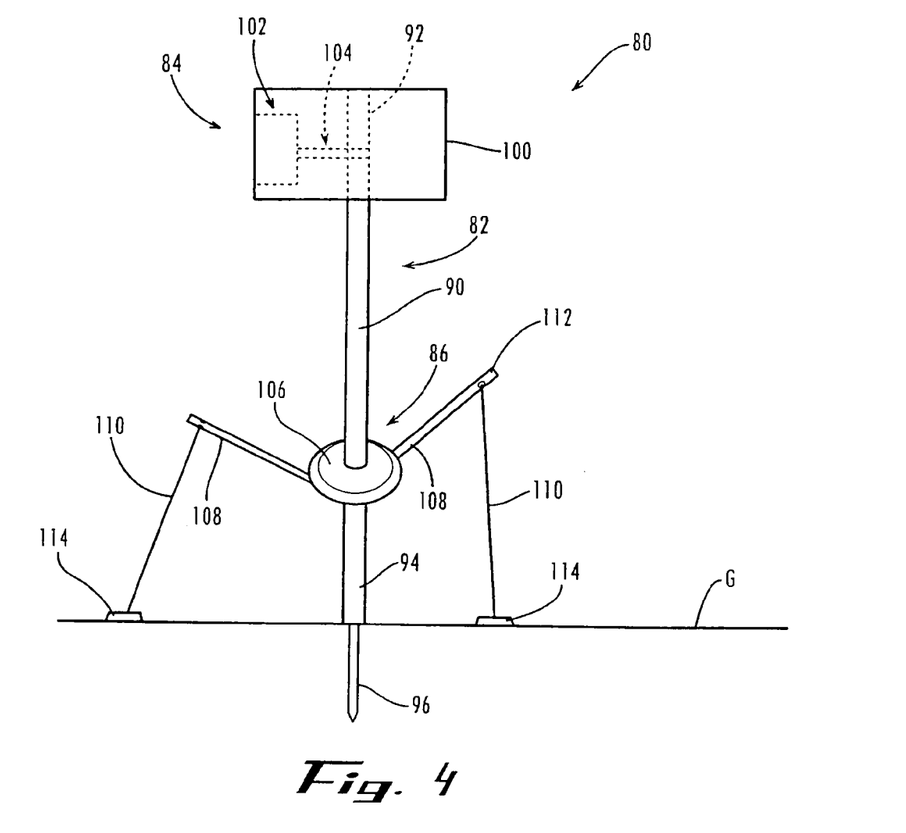
FIG. 4 is a perspective view of a device for remotely generating sounds associated with movements of animals in accordance with an alternate embodiment of the invention.

With reference now to FIG. 4, there is seen an alternate embodiment of a device 80 for generating sounds associated with movements of animals, and particularly the sound of a turkey rustling through grass, leaves or other ground debris as during feeding. The device 80 preferably includes a movable member 82, a motion generation system 84, and an extension assembly 86.

The movable member 82 is preferably a rotatable shaft 90 having opposite ends 92 and 94, and preferably including a rod 96 telescopically withdrawable from the end 94.

The motion generation system 84 preferably includes a housing 100 enclosing a motor 102 and a transmission system 104 for transmitting rotational motion of the motor 102 to the shaft 90. The housing 100, motor 102, and transmission system 104 are preferably substantially identical to the housing 30, motor 34, and transmission system 38 previously described.

The extension assembly 86 preferably includes a hub 106 mounted to the shaft 90 and having a plurality of extension members 108 connected thereto. The hub 106 is preferably substantially identical to the hub 60 previously described. The extension members 108 are preferably elongate rods or the like pivotally mounted to the hub 106 as by pins or other hinge devices, with the angle of each extension member 108 being adjustable relative to the hub 106. For example, a threaded fastener may be passed through aligned apertures of the extension member and the hub for pivotal mounting of the extension member to the hub, with the fastener being tightened to lock the extension member at a desired angle.

A wire 110 or a chord or the like preferably extends from a location adjacent free end 112 of each extension member 108. The wire 110 preferably has a sufficient length to contact the ground G regardless of the angular position of the extension member 108. Feet 114, preferably substantially similar in construction to the feet 70 described previously, are preferably connected to the wires 110 for contacting the ground.

Figure 5:
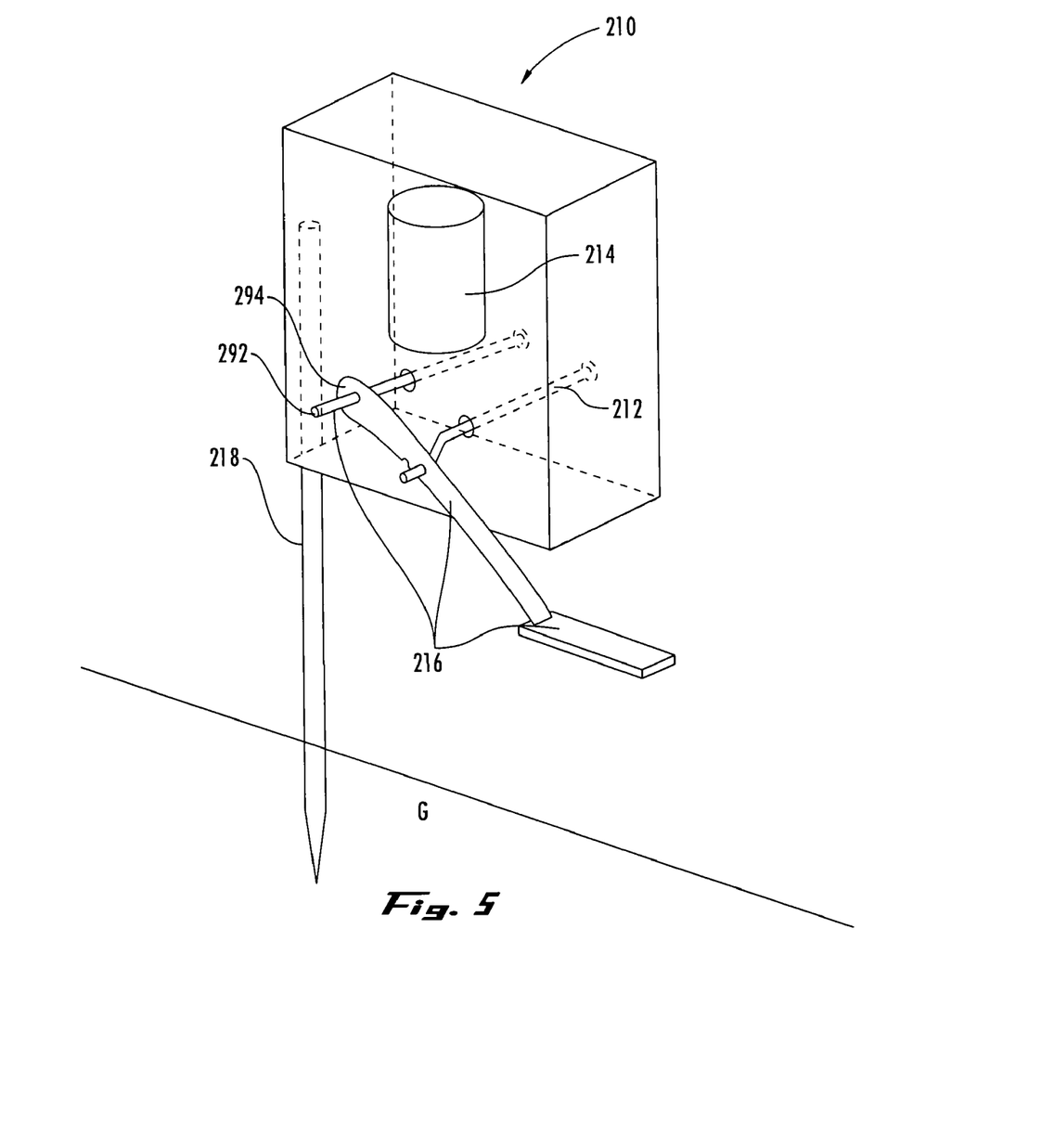
FIGS. 5 and 6 are perspective views of another device for remotely generating sounds associated with movements of animals in accordance with yet another embodiment of the invention.
Figure 6:
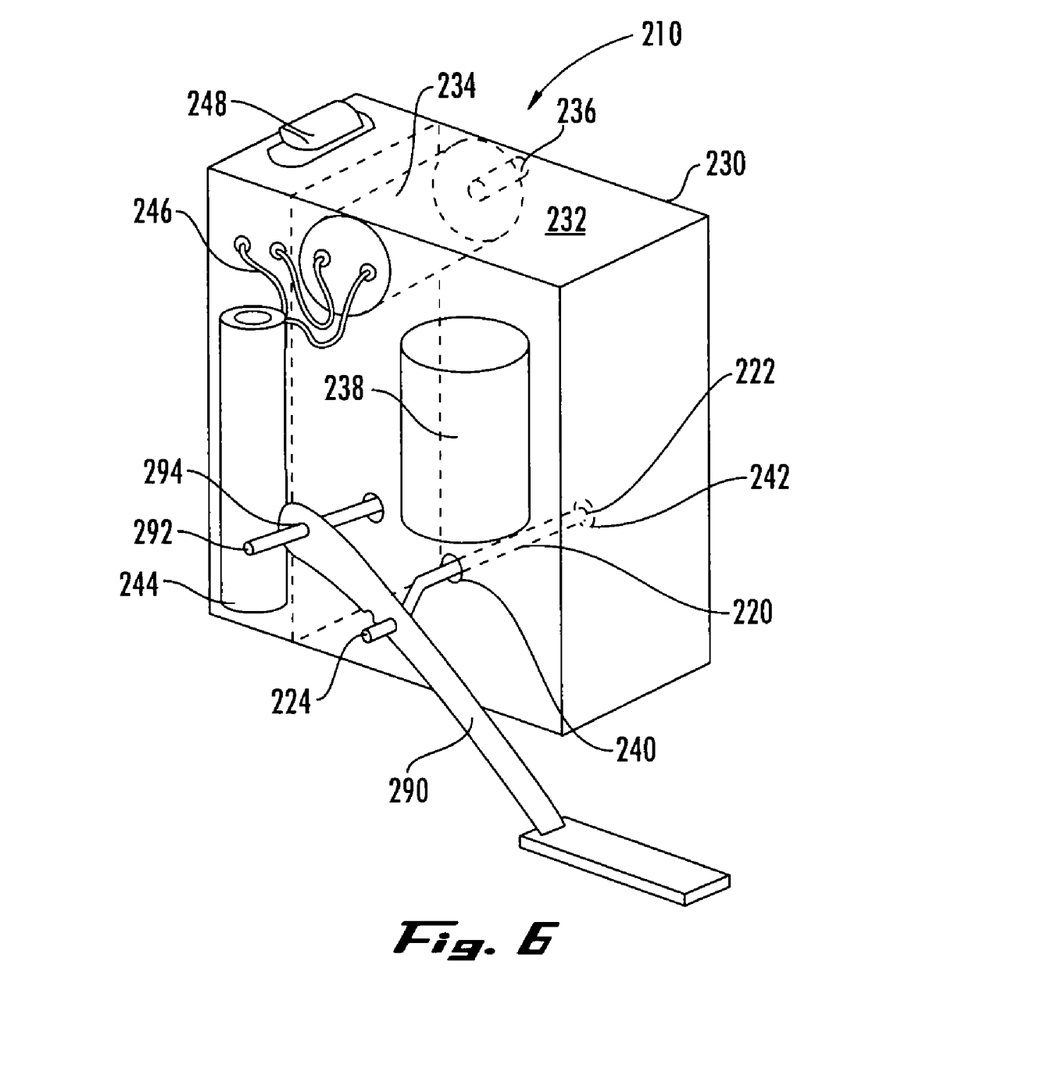

In another embodiment with initial reference to FIG. 5 and FIG. 6, there is shown a game attractant device 210 for generating sounds associated with movements of animals. The device 210 is particularly suitable for remotely generating sounds to mimic the sound of a turkey rustling through grass, leaves or other ground debris as during feeding.

The device 210 includes a movable member operatively associated with a motion generation system and configured to be set in a desired motion by the motion generation system, and an extension assembly configured to replicate a leg of an animal. The extension assembly includes an upper portion pivotally mounted relative to a pivot point and a lower portion connected to the movable member for being driven by the movable member in a desired path for contact with a desired contact medium to generate sounds that mimic sounds associated with movements of animals.

In this regard, the device 210 preferably includes a movable member 212, a motion generation system 214, an extension assembly 216, and an anchor member 218. The movable member 212 is configured to be set in a desired motion by the motion generation system 214. For example, in a preferred embodiment, a rotational motion is imparted to the movable member 212 by the motion generation system 214. It will be understood that the movable member 212 may be capable of other motions, such as translational and reciprocal motion.

The extension assembly 216 is desirably configured to replicate a leg and also preferably a foot portion of a live turkey. The extension assembly includes an upper portion that connects to a fixed pivot point and a lower portion that cooperates with the movable member 212 so as to cause contact with a desired contact medium in a manner to generate a sound in a manner corresponding to that of a turkey leg/foot contacting the ground.

For example, in a preferred embodiment described below, portions of the extension assembly 216 may be a simple stick or a simple stick having a portion which extends to replicate a foot. The extension assembly is positioned during operation of the device to contact grass, leaves or other debris on the ground to generate a rustling sound that mimics the sound of a turkey rustling through grass, leaves or other ground debris as during feeding. The anchor member 218 holds the device 210 substantially stationary relative to the ground G.

Figure 7:
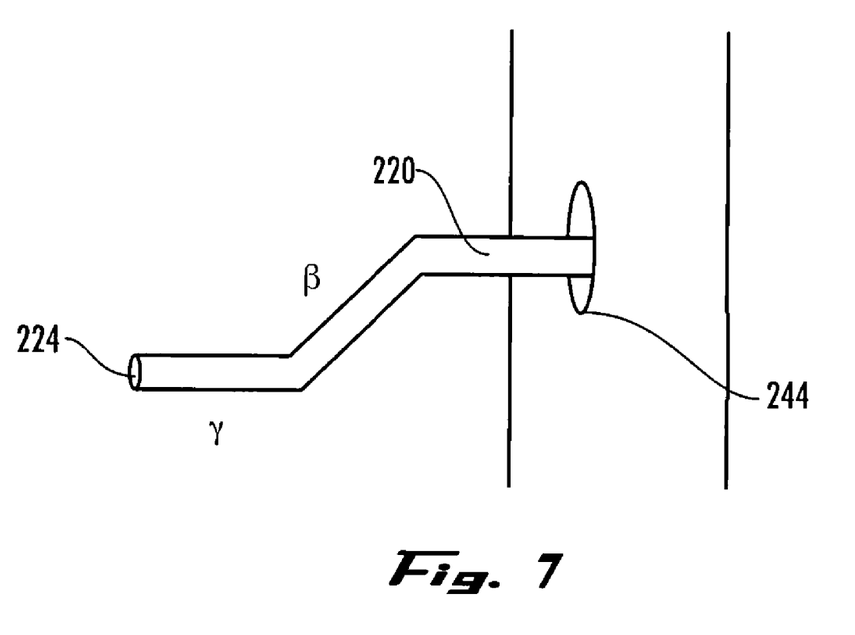
FIG. 7 is a detailed view of a shaft component of the device of FIGS. 5 and 6.

With further reference to FIG. 5 and FIG. 6, and with additional reference to FIG. 7, the movable member 212 may preferably be a rotatable shaft 220 and the motion generation system 214 may preferably be configured to cooperate with the shaft 220 to impart rotational motion to the rotatable shaft 220. The rotatable shaft 220 is preferably an elongate shaft having a first end 222 (FIG. 5) and a second end 224, with a relatively small external diameter of from about ⅛ to about 1 inch.

In one embodiment, the rotatable shaft 220 extends from the device 210 and includes a non-linear portion. For example, the shaft 220 bends at least once at an angle $\beta$ relative to an initial orientation of the rotatable shaft 220. Angle $\beta$ preferably ranges from about twenty degrees to about ninety degrees. In the embodiment shown in FIG. 7, the shaft 220 is bent twice, once at angle $\beta$ and then again at a second angle $\gamma$ relative to the second orientation of the shaft. Angle $\gamma$ preferably ranges from about twenty degrees to about ninety degrees. The bends help provide a desired motion path of the extension assembly 216.

The motion generation system 214 is preferably located within a housing 230, preferably of plastic having a removable cover 232, enclosing a motor 234, preferably a small direct current motor having a rotatable output shaft 236, and a transmission system 238 for transmitting rotational motion of the output shaft 236 to the rotatable shaft 220. In this regard, the housing 230 preferably includes oppositely disposed apertures 240 and 242 for passage of the rotatable shaft 220 through the housing 230.

The motor 234 may be of single speed or may include electronic controllers or the like for adjusting and/or varying its rotational speed as may be desired. For use in generating sounds mimicking a turkey or turkeys feeding, the motor 234 preferably has a rotational speed of from about 5 to about 50 rpms.

The motor 234 is preferably powered as by a battery 244, such as a AA size battery, located within the housing 230 and connectable to wiring 246 associated with the motor 234. The wiring 246 is preferably connected to an on/off switch 248 associated with the motor 234 and partially extending through the housing 230 for access by a user. As will be appreciated, a remotely activatable switch, such as an infrared switch may be utilized instead of the mechanical switch 248. As noted above, a timing or other control device may also be incorporated to periodically control the operation of the motor 234. For example, the motor may be periodically controlled to start or stop motion and/or change the speed thereof.

Figure 8:
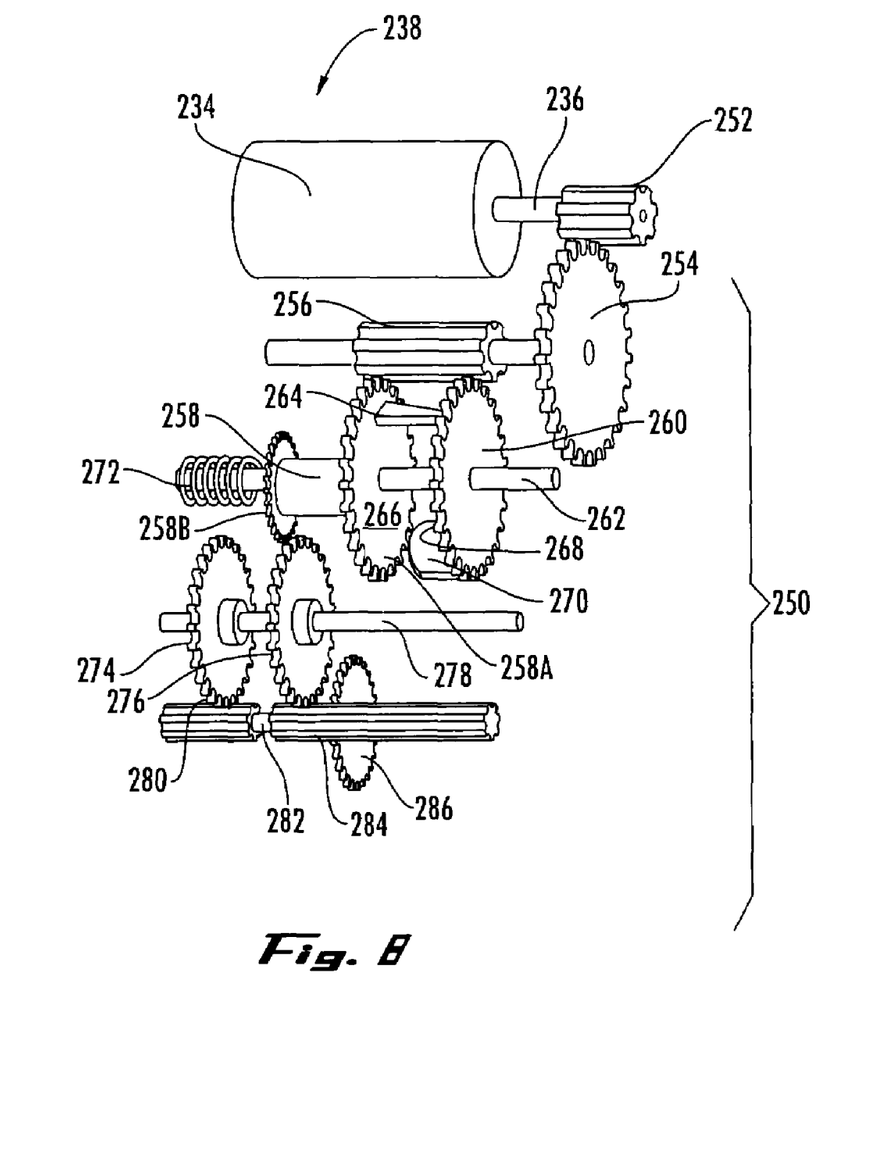
FIG. 8 is an exploded perspective view of a transmission system of the device of FIGS. 5 and 6.

With reference now to FIG. 8, the transmission system 238 is preferably provided as by a gear assembly 250 associated with the output shaft 236 of the motor 234. The gear assembly 250 preferably includes a first gear structure 252 associated with the rotatable output shaft 236. The first gear structure 252 preferably fits along and is orientated with the rotatable output shaft 236. The first gear structure 252 is also preferably associated with a second gear structure 254 that is substantially fixed along a first rotatable gear shaft 256. Accordingly, rotation of the rotatable output shaft 236 during operation of the motor 234 results in rotation of the first gear structure 252, the motion of which is transferred to the second gear structure 254, and then imparted by the second gear structure 254 to the first rotatable gear shaft 256.

Figure 9:
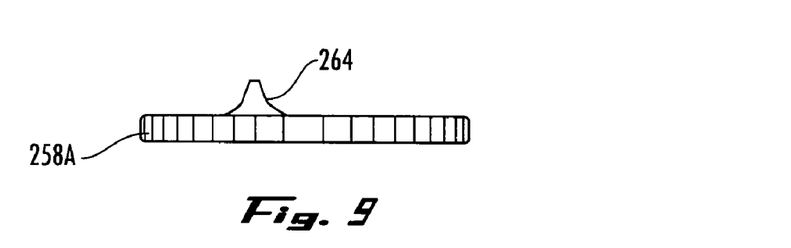
FIGS. 9-11 are detailed views of components of the transmission system of FIG. 8.
Figure 10:
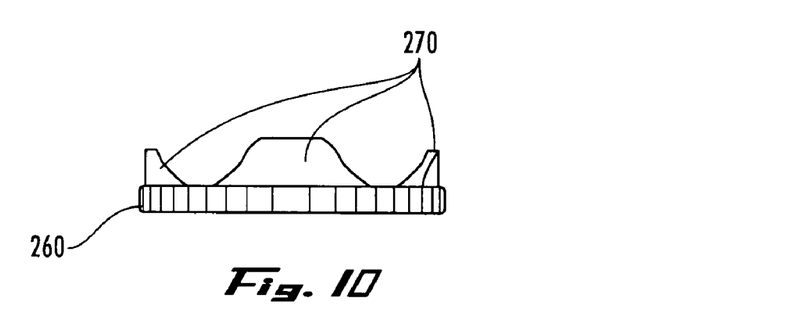

The first rotatable gear shaft 256 is associated with both a third gear structure 258 and a fourth gear structure 260. Both the third gear structure 258 and the fourth gear structure 260 are configured along a first rotatable bar shaft 262. The third gear structure 258, which is preferably substantially one structure, is further divided into a first gear head 258A and a second gear head 258B, with the first gear head 258A associated with the first rotatable gear shaft 256. In this embodiment, the first gear head 258A contains at least one gear tooth 264 disposed on a first lateral surface 266 of the first gear head 258A. FIG. 9 shows a side view of the first gear head 258A described in this embodiment, with the first lateral surface 266 facing up, out of view, and the gear tooth 264 visible.

With reference now back to FIG. 8, the first lateral surface 266 of the first gear head 258A is oriented such that it faces a second lateral surface 268 oriented on one side of the fourth gear structure 260. The second lateral surface 268 contains at least one gear mound 270. The third gear structure 258 is preferably configured to 5 rotate at a higher rotational speed than the fourth gear structure 260. During operation of the device 210, the first rotatable gear shaft 256 imparts motion to both the third gear structure 258 and the fourth gear structure 260. The gear tooth 264 remains in substantially continuous contact with the second lateral surface 268 of the fourth gear structure 260 as by a force exerted from a spring 272 oriented along the first rotatable bar shaft 262. The gear tooth 264 preferably intermittently travels across the gear mound 270.

The second gear head 258B is intermittently associated with a fifth gear structure 274 and a sixth gear structure 276. As the gear tooth 264 travels across the gear mound 270, the third gear structure 258 is displaced laterally, compressing the spring 272, thereby substantially disengaging the second gear head 258B from the sixth gear structure 276 and substantially engaging the second gear head 258B with the fifth gear structure. The fifth gear structure 274 and the sixth gear structure 276 are preferably located along a second rotatable bar shaft 278. The fifth gear structure is associated with a second rotatable gear shaft 280, the second rotatable gear shaft 280 being substantially oriented with and configured partially along a third rotatable bar shaft 282. The sixth gear structure 276 is associated with a third rotatable gear shaft 284, the third rotatable gear shaft 284 being substantially oriented with and located partially along the third rotatable bar shaft 282.

Figure 11:
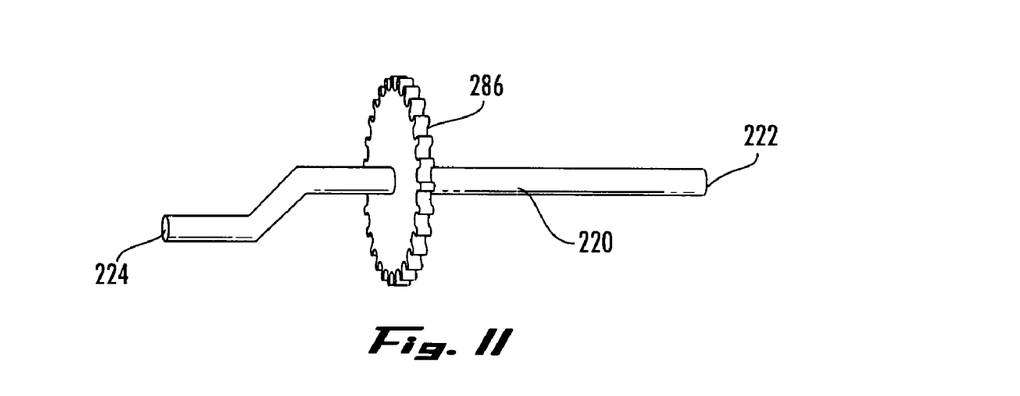

During operation, when the second gear head 258B is substantially engaged with the sixth gear structure 276, rotational motion is imparted to the sixth gear structure 276. The rotational motion is further imparted to the third rotatable gear shaft 284. The third rotatable gear shaft 284 is associated with a seventh gear structure 286. With reference now to both FIG. 8 and FIG. 11, the seventh gear structure 286 is substantially fixed partially along the rotatable shaft 220. During operation of the device 210, rotational motion is imparted from the third rotatable gear shaft 284 to the seventh gear structure 286. In turn, the seventh gear structure 286 imparts rotational motion to the rotatable shaft 220.

With reference again to FIG. 6, the extension assembly 216 preferably includes at least one extension member 290 and a fifth rotatable bar shaft 292. The extension member 290 is preferably of sufficient length so as to be able to contact the ground G or other contact surface during use of the device 210. The extension member 290 is preferably associated with the fifth rotatable bar shaft 292, the fifth rotatable bar shaft 292 acting as a substantially fixed pivot structure at a first location 294 along the extension member 290. The extension member 290 is also preferably associated with the rotatable shaft 220 at a second location along the extension member 290 adjacent the second end 224 to impart motion to the extension member 290.

Figure 12:
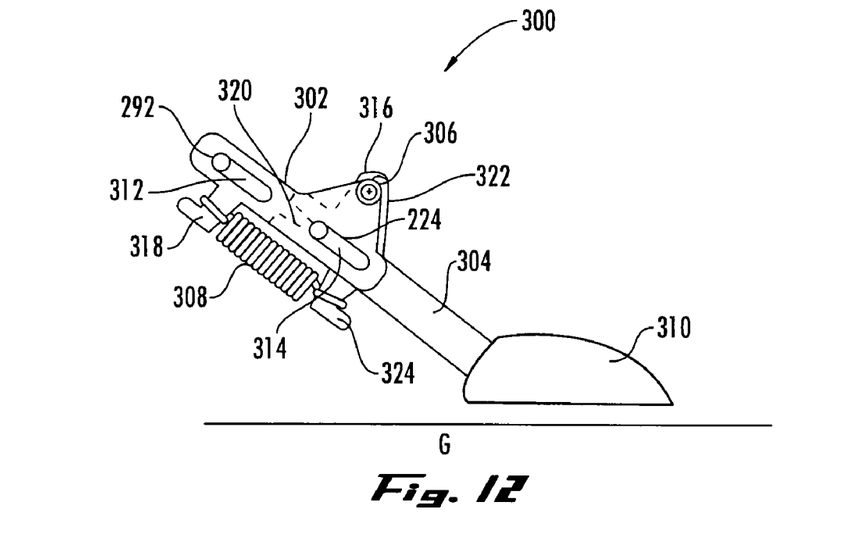
FIG. 12 is a side view of an extension member suitable for use with the device of FIGS. 5 and 6.
Figure 13:
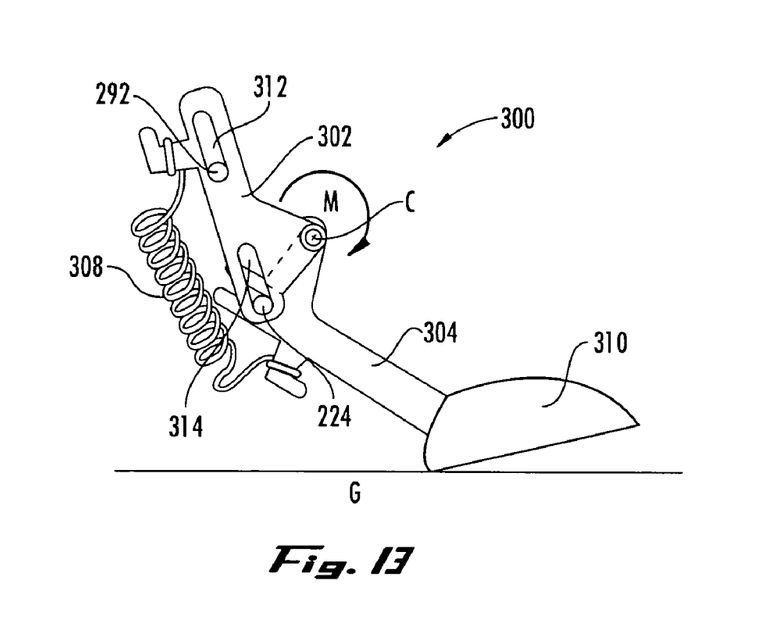
FIG. 13 shows relative motion of the components thereof during use.

In another embodiment, as, shown in FIG. 12 and FIG. 13, the extension which provides ground contact may be provided by a hinged extension assembly. For example, in a preferred embodiment, an extension member 300 may include an upper leg 302, a lower leg 304, a connection joint 306, a joint spring 308, and a foot 310. The upper leg 302 may also preferably include a slot 312 into which the fifth rotatable bar shaft 292 extends, a slot 314 into which the second end 224 of the rotatable shaft 220 extends, an aperture 316 through which the connection joint 306 is situated, and a first joint spring anchor 318.

The lower leg 304 also preferably includes an open-ended slot 320 movably alignable with the slot 314 and through which the second end 224 of the rotatable shaft 220 moves during operation, an aperture 322 through which the connection joint 306 is situated, and a second joint spring anchor 324. The foot 310 is preferably fastened to the lower leg 304 as by use of adhesive or wax, or by a fastener such as a screw, nail, snap, or the like. The foot 310 and lower leg 304 may also be formed as a unitary structure.

During operation of the device 210, the extension member 300 preferably contacts the ground G, thereby causing the extension member 300 to intermittently bend at the connection joint 306. As the extension member 300 bends, the joint spring 308 flexes, exerting a moment M about point C substantially at the location of the connection joint 306. The moment M substantially forces the foot 310 to remain in substantially continuous contact with the ground G. The motion of the extension member 300 described herein substantially simulates, among other things, the sound of small game scratching at the ground. It has been further observed that such rustling sounds are advantageous when hunting turkeys, especially when used in conjunction with a call that mimics the vocal sounds of a turkey.

The device 210 is preferably installed as by inserting the anchor member 218 into the ground G so that the housing 230 is adjacent the ground G. Leaves, twigs, grass, or other debris is preferably lightly piled around the extension member 300 and the switch 248 activated to enable power to be supplied to the motor 234 and result in rotation of the at least one extension member 290 or the extension member 300.

While the intention has been described in the context of a device for generating sounds for attracting turkeys, it will be understood that the devices described herein may be desirably configured to generate desired sounds.

The foregoing description of certain exemplary embodiments of the present invention has been provided for purposes of illustration only, and it is understood that numerous modifications or alterations may be made in and to the illustrated embodiments without departing from the spirit and scope of the invention as defined in the following claims.

What is claimed is:

1. A device for generating sounds associated with movements of animals, the device comprising: a movable member operatively associated with a motion generation system and configured to be set in a desired motion by the motion generation system, and an extension assembly configured to replicate a leg of an animal and including an upper portion pivotally mounted relative to a pivot point and a lower portion connected to the movable member for being driven by the movable member in a desired path for contact with a desired contact medium to generate sounds that mimic sounds associated with movements of animals, wherein the extension assembly includes a connection joint which connects the upper and lower portions of the extension assembly, and a joint spring which extends between the upper and lower portions of the extension assembly, wherein the connection joint functions as a hinge and the joint spring creates a moment about the connection joint that urges the lower portion of the extension assembly to remain in substantially continuous contact with the contact medium as the extension assembly travels through the desired path.

2. The device of claim 1, wherein the movable member comprises a rotatable shaft.

3. The device of claim 1, wherein the motion generation system comprises a motor having a rotatable output shaft and a transmission system for transmitting rotational motion of the output shaft of the motor to the movable member.

4. The device of claim 1, further comprising a housing within which the motion generation system is located, wherein the pivot point is provided by a shaft which extends out of the housing.

5. The device of claim 4, further comprising a fastener for fixing the housing relative to the contact medium.

6. A device for generating sounds associated with movements of animals, the device comprising: a housing and a motor located within the housing; a rotatable shaft driven by the motor and having a portion extending outwardly from the housing, an extension assembly located exterior to the housing and configured to replicate a leg and foot of an animal and including an upper portion pivotally mounted relative to a pivot point extending from the housing and a lower portion connected to the portion of the rotatable shaft which extends outwardly from the housing for being driven in a desired path for contact with a desired contact medium to generate sounds that mimic sounds associated with movements of animals, wherein the portion of the rotatable shaft which extends outwardly from the housing includes a non-linear portion configured to provide a desired motion path.

7. The device of claim 6, wherein the upper and lower portions of the extension assembly are hingedly coupled.

* * * * *